July 9, 1935.   S. H. SMITH   2,007,776
AIRPLANE PROPELLER
Original Filed July 28, 1931
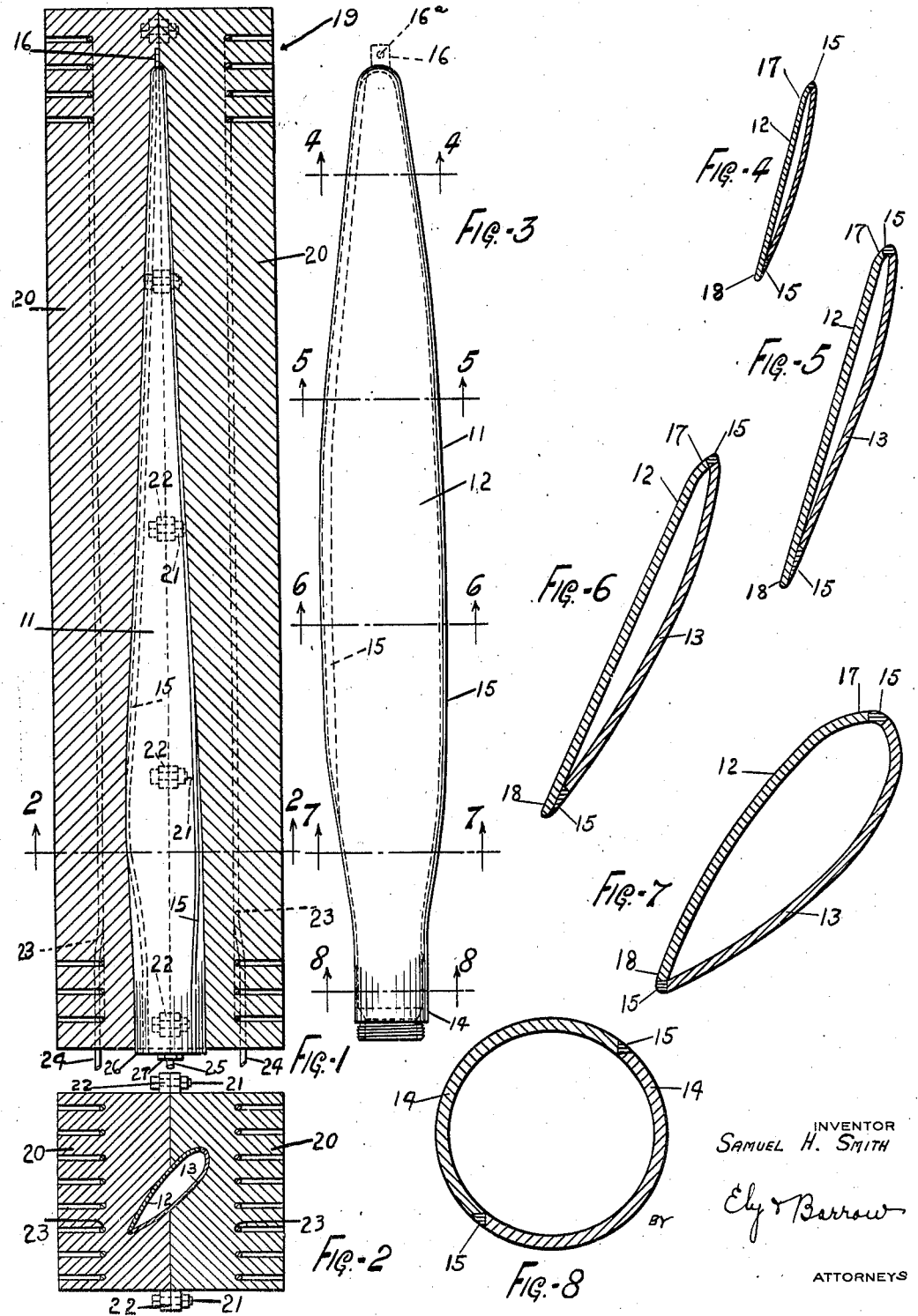
INVENTOR
Samuel H. Smith
By Ely & Barrow
ATTORNEYS Patented July 9, 1935

2,007,776

UNITED STATES PATENT OFFICE 2,007,776

AIRPLANE PROPELLER

Samuel H. Smith, Rocky River, Ohio, assignor, by mesne assignments, to Aviation Manufacturing Corporation, Chicago, Ill., a corporation of Delaware Original application July 28, 1931, Serial No. 553,521. Divided and this application October 3, 1932, Serial No. 635,961

6 Claims. (Cl. 170—159)

This invention relates to improvements in aircraft propellers, and it is an object of this invention to produce a durable hollow metallic propeller blade from rolled metal blanks without overlapping or folding over the edges of the two faces of the blade.

Another object of this invention is to provide a propeller blade formed from two metallic blanks joined by welding positioned along the neutral axis of the blade where there is the minimum stress, and thus to subject the welding to a minimum strain and thereby produce a blade capable of withstanding relatively greater strain and stress than in propellers now in use.

Still another object is to provide a metallic propeller blade which possesses such strength as will avoid necessity of employing interior braces or webs.

In the drawing, in which the preferred and best known form of the invention is shown and described:

Fig. 1 is a longitudinal section of the shaping die showing the propeller mounted therein;

Fig. 2 is a section on the line 2—2 of Fig. 1;

Fig. 3 is an elevation view on the pressure face of the blade; and

Figs. 4, 5, 6, 7 and 8 are enlarged sections taken on lines 4—4, 5—5, 6—6, 7—7 and 8—8 respectively of Fig. 3.

This application forms a divisional application of my copending application Serial No. 553,521 filed July 28, 1931, in compliance with a requirement for division in that case made by the Patent Office.

I show my invention as applied to a propeller blade 11, comprising a pressure face or thrust face 12, and a suction face or camber member 13, both of said faces terminating in a tubular shank portion 14. The blade 11 is preferably formed from two rolled, tapered metallic blanks, not shown herein, which are first placed in dies where they are formed and cut to contour. The two cooperating portions of the blade are then held closely together in a jig, and are welded together by any suitable means.

In this case, the weld is indicated by the dotted lines in Figures 1 and 3, and is shown in section in Figures 4 through 8. The tip of the blade 11 is provided with a lug 16 having an aperture 16a, and serving a purpose hereinafter explained.

It will be noticed, by referring to sectional views 4 through 8, that the weld 15 at the leading edge 17, is positioned exactly at the point of intersection of the two blade faces and, in fact, forms the rearwardly flared or V-shaped edge portion along the leading edge. Furthermore, that the weld 15, at the trailing edge 18, is positioned solely within the suction face 13 from the tip of the blade to substantially that part of the blade shown in Figure 7, from which point on to the end of the shank the weld is positioned at the point of intersection of the two faces and, in fact, forms the outside edge at the trailing edge 18. The rear edge of the suction face blank terminates forwardly of the rear edge of the pressure face blank and the metal of the weld 15 fills in the angle between said edge and face and slopes rearwardly from the suction face to the trailing edge of the pressure face blank.

Preferably my new and improved blade is made as follows, although other suitable means may be used. After the blade has been shaped and the two sections have been welded together, the blade is suspended by the lug 16 on anchoring means in a heated furnace, with the aperture 16a of the lug 16 directly in line with the centers of gravity of the various cross sections of the blade, so that while the blade is still in a hot condition the heavier parts of the blade will tend to straighten the tip sections thereof.

The next step in the manufacture of the blade is provided in order to accurately align and precisely shape the blade, and to eliminate cause of flaws in the metal by eliminating cold working. A mold 19, having two corresponding sections 20, clamped together by aligned studs 21, cooperating with brackets 22, is provided with electric heating elements 23, connected by conductors 24, to a source of current. Any suitable heating means may be used to heat the mold 19, and it will be understood that I do not intend to limit my invention to the specific heating means shown herein.

The blade, which has been brought up to heat treating temperature in the furnace, is placed in the hot mold 19, which has been heated by the electric heating elements 23, and the two sections 20 of the mold are clamped tightly together by the studs 21.

While the temperature in the mold 19 is thus maintained at the proper temperature by the electric heating elements 23, compressed air is introduced into the interior of the blade 11, through the shank 14, by means of an air tube 25, connected to an air compressing means not shown herein, and secured to a closure member 26 by a nut 27.

To secure the best results, the temperature in the mold should be sufficiently high to cause the metal to be pliable and readily shaped, while the air pressure should be high enough to exceed the yield point of the metal at the parts requiring forming, and should be maintained long enough to insure permanent setting of the metal. This process of heating metal and introducing compressed air into the blade may be repeated several times, and when properly operated, will cause all parts of the blade to be properly formed and aligned.

In actual use, the strain is relatively much greater on the pressure face than on the suction face of a blade, due to the tensile load caused by the centrifugal thrust plus the tensile load caused by bending. The suction face carries less load than the pressure face on account of the tensile load from centrifugal force being offset by the compression load due to bending.

In the present invention the welds are located as near the neutral axis as is possible. Those parts of the weld which are not on the exact neutral axis, are on the compression side. Along the neutral axis there are neither tensile nor compression loads due to bending strains set up by the torque and thrust, but merely a tensile load due to centrifugal force.

The torque shock on modern airplane engines varies as much as twenty percent over average torque, which is average rotational power. Resultant force occurs at about 45° to the plane of rotation. This condition occurs at about right angles to the longitudinal axis of the blade section in the part on the propeller in towards the hub, which is the part where blade failures are most numerous and dangerous. Making the load on the welds as light and favorable as possible, in the condition of steady torque and thrust, allows the welds more freedom to absorb the additional load put on at the time of shock due to explosion of a cylinder. In present day airplane engines of 700 H. P. or more, the thrust of the engine is very great.

By placing the weld on the suction face instead of on the pressure, the load is changed from a tensile load to a compressive strain, and thus materially lowers the unit loading.

From the foregoing it will be apparent to those skilled in the art that I have provided a new and improved hollow metallic propeller blade made from two blanks joined by welding, which is positioned where it will be subjected to the minimum stress and strain.

At the same time it will be apparent to those skilled in the art, that my invention includes advantages, uses and adaptions other than those specifically pointed out or mentioned herein, and that my invention may be variously changed, used or modified, all without departing from the spirit of my invention or sacrificing the advantages thereof. It, therefore, will be understood that the embodiment of my invention herein set forth is illustrative only and my invention is not limited thereto.

What is claimed is:

1. A hollow metal blade for aircraft propellers comprising two metal blanks, one of said blanks being shaped to form the suction face, the other blank being shaped to form the pressure face, a weld between the edges of the bank at the trailing edge of the blade and an inlaid metal weld between the mating edges of the blanks at the leading edge of the blade, the metal of the weld being positioned and extended to form the leading edge substantially throughout the effective length of the blade and rearwardly flared outer faces.

2. A hollow metal blade for aircraft propellers comprising two metal blanks, one of said blanks being shaped to form the suction face, the other blank being shaped to form the pressure face, a weld between the edges of the blank at the trailing edge of the blade and an inlaid metal weld between the mating edges of the blanks at the leading edge of the blade, the metal of the weld being positioned and extended to form a rearwardly flared leading edge substantially throughout the effective length of the blade and rearwardly flared outer faces.

3. A hollow metal blade for aircraft propellers comprising two metal blanks, one of said blanks being shaped to form the suction face, the other blank being shaped to form the pressure face, a weld between the edges of the blank at the trailing edge of the blade each blank being provided with an integral semi-annular shank portion, and an inlaid metal weld between the mating edges of the blanks at the leading edge of the blade, the metal of the weld being positioned and extended to form the leading edge substantially throughout the effective length of the blade and rearwardly flared outer faces.

4. A hollow blade for aircraft propellers comprising two metal blanks, one of said blanks being shaped to form the suction face, the other blank being shaped to form the pressure face, the trailing edge of the pressure-face blank being extended rearwardly beyond the trailing edge of the suction face blank, and a rearwardly tapered inlaid weld between the rear edge of the suction face blank and the rear face of the pressure face blank positioned wholly within the suction face from the tip of the blade substantially to the inner end of its effective length.

5. A hollow blade for aircraft propellers comprising two metal blanks, one of said blanks being shaped to form the suction face, the other blank being shaped to form the pressure face, each blank being provided with an integral semi-annular shank portion, the trailing edge of the pressure-face blank being extended rearwardly beyond the trailing edge of the suction face blank, and a rearwardly tapered inlaid weld between the rear edge of the suction face blank and the rear face of the pressure face blank positioned wholly within the suction face from the tip of the blade substantially to the inner end of its effective length.

6. A hollow blade for aircraft propellers comprising two metal blanks, one of said blanks being shaped to form the suction face, the other blank being shaped to form the pressure face, each provided with a semi-annular shank portion, an inlaid metal weld between the mating edges of the blanks at the leading edge of the blade, the metal of the weld being positioned and extended to form the leading edge substantially throughout the effective length of the blade, the trailing edge of the pressure face blank being extended rearwardly beyond the trailing edge of the suction face blank, and a rearwardly tapered inlaid weld between the rear edge of the suction face blank and the rear face of the pressure face blank positioned wholly within the suction face from the tip of the blade substantially to the inner end of its effective length.

SAMUEL H. SMITH.